United States Patent
Vrcelj et al.

(10) Patent No.: US 11,468,629 B2
(45) Date of Patent: Oct. 11, 2022

(54) METHODS AND APPARATUS FOR HANDLING OCCLUSIONS IN SPLIT RENDERING

(71) Applicant: QUALCOMM Incorporated, San Diego, CA (US)

(72) Inventors: Bojan Vrcelj, San Diego, CA (US); Gerhard Reitmayr, Del Mar, CA (US); Joseph Daniel Garvey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,179

(22) Filed: Oct. 1, 2020

(65) Prior Publication Data

US 2021/0312701 A1 Oct. 7, 2021

Related U.S. Application Data

(60) Provisional application No. 63/005,164, filed on Apr. 3, 2020.

(51) Int. Cl.
*G06T 15/20* (2011.01)
*G06T 19/00* (2011.01)
*G06T 1/20* (2006.01)
*G06T 15/40* (2011.01)

(52) U.S. Cl.
CPC ............ *G06T 15/205* (2013.01); *G06T 1/20* (2013.01); *G06T 15/40* (2013.01); *G06T 19/006* (2013.01)

(58) Field of Classification Search
None
See application file for complete search history.

(56) References Cited

U.S. PATENT DOCUMENTS

| 9,122,053 | B2 | 9/2015 | Geisner et al. |
| 9,286,725 | B2 | 3/2016 | Vasquez, II et al. |
| 9,754,419 | B2 | 9/2017 | Petrovskaya et al. |

(Continued)

OTHER PUBLICATIONS

Schneider et al., Augmented Reality based on Edge Computing using the example of Remote Live Support, Dec. 2017, IEEE, 1277-1282 (Year: 2017).*

(Continued)

*Primary Examiner* — Robert J Craddock
(74) *Attorney, Agent, or Firm* — Campbell C. Chiang; ArentFox Schiff LLP

(57) ABSTRACT

The present disclosure relates to methods and apparatus for graphics processing. Aspects of the present disclosure may identify a first content group and a second content group in a scene. Further, aspects of the present disclosure may determine whether at least a portion of the first content group occludes or potentially occludes at least a portion of the second content group. Additionally, the present disclosure may represent the first content group and the second content group based on the determination whether at least a portion of the first content group occludes or potentially occludes at least a portion of the second content group. In some aspects, the first content group may include at least some real content and the second content group includes at least some augmented content. The present disclosure may also render at least a portion of surfaces of the first content group using an occlusion material.

34 Claims, 7 Drawing Sheets

(56) References Cited

U.S. PATENT DOCUMENTS

2019/0147636 A1     5/2019    Overbeck et al.
2019/0197765 A1     6/2019    Molyneaux et al.

OTHER PUBLICATIONS

Berger M-O., "Resolving Occlusion in Augmented Reality: a Contour Based Approach without 3D Reconstruction", Computer Vision and Pattern Recognition, 1997. Proceedings., 1997 IEEE Computer Society Conference on San Juan, Puerto Rico Jun. 17-19, 1997, Los Alamitos, CA, USA,IEEE Comput. Soc, US, Jun. 17, 1997 (Jun. 17, 1997), pp. 91-96, XP010237507, DOI: 10.1109/CVPR.1997.609304, ISBN: 978-0-8186-7822-6, The whole document, Abstract, Sections 3, 4; figures 2, 4, 5.

Breen D.E., et al., "Interactive Occlusion and Automatic Object Placement for Augmented Reality", Computer Graphics Forum, Wiley-Blackwell Publishing Ltd, GB, Journal of the European Association for Computer Graphics, Wiley-Blackwell, Oxford, vol. 15, No. 3, Aug. 26, 1996 (Aug. 26, 1996), pp. 11-22, XP002515919, ISSN: 0167-7055, DOI: 10.1111/1467-8659.1530011, abstract, section 4.2; Figures 1, 2, 5.

Kalkofen D., et al., "Visualization Techniques for Augmented Reality," Handbook of Augmented Reality, Springer Science and Business Media, LLC, Retrieved from the Internet: URL: http://www.magicvisionlab.com/pub/kalkofen_bookchapter11/paper.pdf, Jan. 1, 2011 (Jan. 1, 2011), XP002733572, ISBN: 978-1-4614-0063-9, 2011, pp. 65-98, Abstract.

Partial International Search Report—PCT/US2021/021245—ISA/EPO—dated Jun. 23, 2021.

International Search Report and Written Opinion—PCT/US2021/021245—ISA/EPO—dated Sep. 28, 2021.

Woodward C., et al., "A Client/Server Architecture for Augmented Assembly on Mobile Phones," Jan. 1, 2010 (Jan. 1, 2010), XP055697620, 17 pages, Retrieved from the Internet: URL: https://www.researchgate.net/profile/Mark_Billinghurst/publication/257133261_A_ClientServer_Architecture_for_Augmented_Assembly_on_Mobile_Phones/links/0046352464b612d85d000000/A-Client-Server-Architecture-for-Augmented-Assembly-on-Mobile-Phones.pdf [retrieved on May 20, 2020] abstract section "Masking and Animation".

* cited by examiner

METHODS AND APPARATUS FOR HANDLING OCCLUSIONS IN SPLIT RENDERING

CROSS-REFERENCE TO RELATED APPLICATION(S)

The present application claims benefit of U.S. Provisional Application No. 63/005,164 entitled "METHODS AND APPARATUS FOR HANDLING OCCLUSIONS IN SPLIT RENDERING" filed Apr. 3, 2020, and is assigned to the assignee hereof and hereby expressly incorporated by reference herein.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium (e.g., a non-transitory readable-computer readable medium), and an apparatus are provided. The apparatus may be a server, a client device, a central processing unit (CPU), a graphics processing unit (GPU), or any apparatus that may perform graphics processing. The apparatus may identify a first content group and a second content group in a scene. The apparatus may also determine whether at least a portion of the first content group occludes or potentially occludes at least a portion of the second content group. Additionally, the apparatus may represent the first content group and the second content group based on the determination whether at least a portion of the first content group occludes or potentially occludes at least a portion of the second content group. In some aspects, the apparatus may render at least a portion of one or more surfaces of the first content group using an occlusion material when the at least a portion of the first content group occludes the at least a portion of the second content group. The apparatus may also generate at least one first billboard in accordance with at least one first plane equation and at least one second billboard in accordance with at least one second plane equation. The apparatus may also generate at least one first mesh and a first shading texture, and at least one second mesh and a second shading texture. Moreover, the apparatus may communicate information associated with the first content group and information associated with the second content group to a client device.

In another aspect, a method of graphics processing includes identifying a first content group and a second content group in a scene; determining whether at least a portion of the first content group occludes or potentially occludes at least a portion of the second content group; and representing the first content group and the second content group based on the determination whether at least a portion of the first content group occludes or potentially occludes at least a portion of the second content group.

In a further example, an apparatus for wireless communication is provided that includes a transceiver, a memory configured to store instructions, and one or more processors communicatively coupled with the transceiver and the memory. The aspect may include the one or more processors being configured to identify a first content group and a second content group in a scene; determine whether at least a portion of the first content group occludes or potentially occludes at least a portion of the second content group; and represent the first content group and the second content group based on the determination whether at least a portion of the first content group occludes or potentially occludes at least a portion of the second content group.

In another aspect, an apparatus for graphics processing is provided that includes means for identifying a first content group and a second content group in a scene; means for determining whether at least a portion of the first content group occludes or potentially occludes at least a portion of the second content group; and means for representing the first content group and the second content group based on the determination whether at least a portion of the first content group occludes or potentially occludes at least a portion of the second content group In yet another aspect, a non-transitory computer-readable medium is provided including one or more processor executing code for graphics processing, the code when executed by a processor causes the processor to identify a first content group and a second content group in a scene; determine whether at least a portion of the first content group occludes or potentially occludes at least a portion of the second content group; and represent the first content group and the second content group based on the determination whether at least a portion of the first content group occludes or potentially occludes at least a portion of the second content group The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
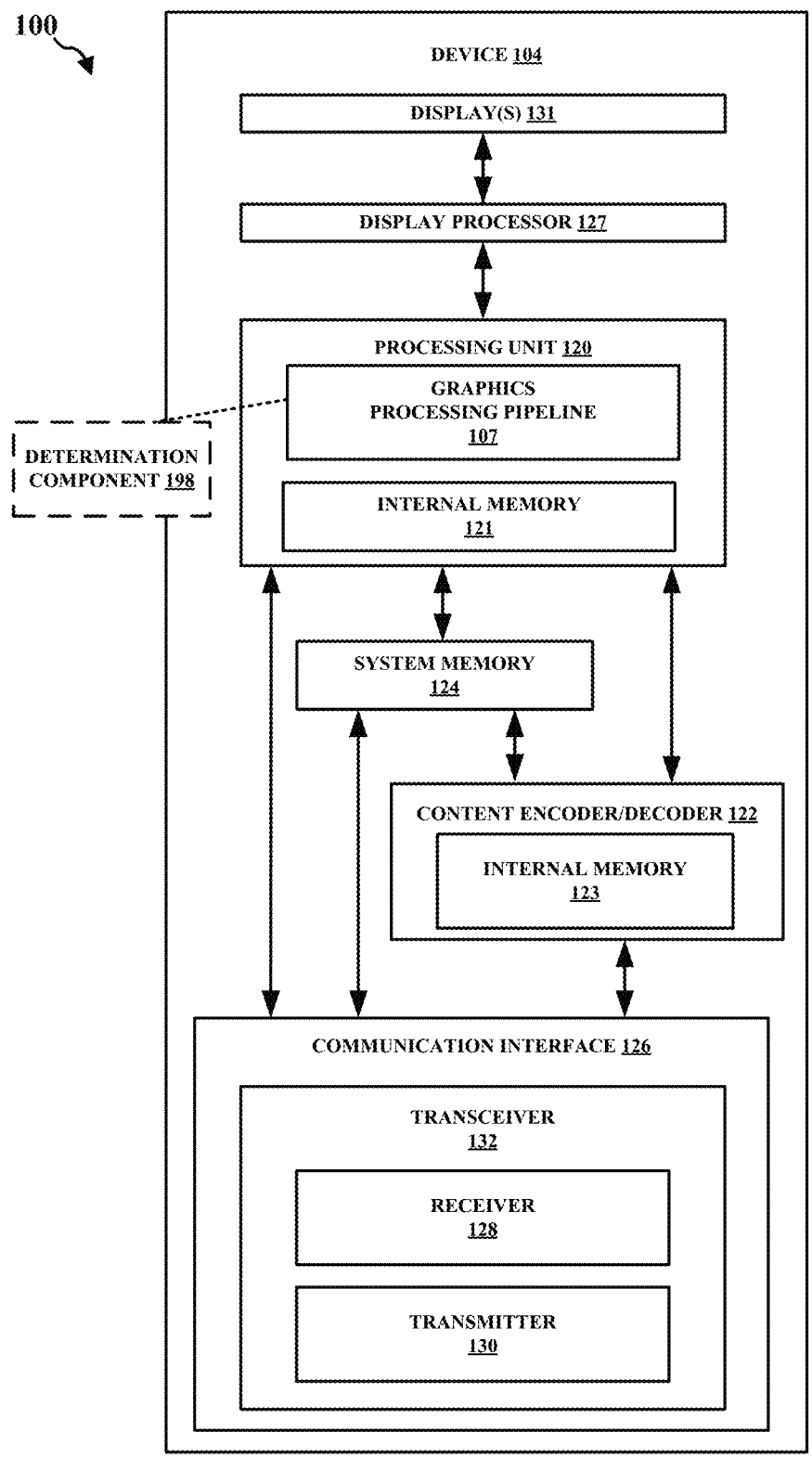
FIG. 1 is a block diagram that illustrates an example content generation system in accordance with one or more techniques of this disclosure.

In augmented reality (AR) systems, capturing occlusions accurately may be a challenge. This may be the case when real-world content occludes augmented content. Moreover, this may be especially true for AR systems with latency issues. An accurate occlusion of real-world content and augmented content may help a user to obtain a more realistic and immersive AR experience. Some aspects of the present disclosure may solve the aforementioned occluding real-world or augmented objects by determining depth information about these objects. For instance, a real world surface may be treated as an occluder for augmentation purposes and may be streamed to a client device and rendered on the client using occlusion material. An object with an occlusion material or a null display value may be treated as a rendered object, but may not be seen at the client display. Accordingly, aspects of the present disclosure may determine or render values for real-world occluding objects, and provide these objects an occlusion material. In some aspects, these an occlusion materials may represent the color of the surfaces which are physically flat, e.g., as in billboards. In other aspects, the occlusion materials may be assigned to surfaces described by a mesh, e.g., meshes corresponding to real-world objects treated as occluders. By doing so, the mesh and/or information regarding the occluding object may become increasingly precise over time. Therefore, aspects of the present disclosure may improve the accuracy of occluding content in split rendering systems.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to identify a first content group and a second content group in a scene. The determination component 198 may also be configured to determine whether at least a portion of the first content group occludes or potentially occludes at least a portion of the second content group. The determination component 198 may also be configured to represent the first content group and the second content group based on the determination whether at least a portion of the first content group occludes or potentially occludes at least a portion of the second content group. The determination component 198 may also be configured to render at least a portion of one or more surfaces of the first content group using an occlusion material when the at least a portion of the first content group occludes the at least a portion of the second content group. The determination component 198 may also be configured to generate at least one first billboard in accordance with at least one first plane equation and at least one second billboard in accordance with at least one second plane equation. The determination component 198 may also be configured to communicate information associated with the first content group and information associated with the second content group to a client device.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

GPUs may render images in a variety of different ways. In some instances, GPUs may render an image using rendering or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. Moreover, in the binning pass, different primitives may be shaded in certain bins, e.g., using draw calls. In some aspects, during the binning pass, a visibility stream may be constructed where visible primitives or draw calls may be identified.

In some aspects of rendering, there may be multiple processing phases or passes. For instance, the rendering may be performed in two passes, e.g., a visibility pass and a rendering pass. During a visibility pass, a GPU may input a rendering workload, record the positions of primitives or triangles, and then determine which primitives or triangles fall into which portion of a frame. In some aspects of a visibility pass, GPUs may also identify or mark the visibility of each primitive or triangle in a visibility stream. During a rendering pass, a GPU may input the visibility stream and process one portion of a frame at a time. In some aspects, the visibility stream may be analyzed to determine which primitives are visible or not visible. As such, the primitives that are visible may be processed. By doing so, GPUs may reduce the unnecessary workload of processing or rendering primitives that are not visible.

In some aspects, rendering may be performed in multiple locations and/or on multiple devices, e.g., in order to divide the rendering workload between different devices. For example, the rendering may be split between a server and a client device, which may be referred to as "split rendering."

In some instances, split rendering may be a method for bringing content to user devices or head mounted displays (HMDs), where a portion of the graphics processing may be performed outside of the device or HMD, e.g., at a server.

Split rendering may be performed for a number of different types of applications, e.g., virtual reality (VR) applications, augmented reality (AR) applications, cloud gaming, and/or extended reality (XR) applications. In VR applications, the content displayed at the user device may correspond to man-made or animated content, e.g., content rendered at a server or user device. In AR or XR content, a portion of the content displayed at the user device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

In AR applications, objects may occlude other objects from the vantage point of the user device. There may also be different types of occlusions within AR applications. For example, augmented content may occlude real-world content, e.g., a rendered object may partially occlude a real object. Also, real-world content may occlude augmented content, e.g., a real object may partially occlude a rendered object. This overlap of real-world content and augmented content, which produces the aforementioned occlusions, is one reason that augmented content and real-world content may blend so seamlessly within AR. This may also result in augmented content and real-world content occlusions being difficult to resolve, such that the edges of augmented and real-world content may incorrectly overlap.

In some aspects, augmented content or augmentations may be rendered over real-world or see-through content. As such, augmentations may occlude whatever object is behind the augmentation from the vantage point of the user device. For example, pixels taking a red (R), green (G), blue (B) (RGB) value may be rendered to occlude real-world objects. Accordingly, an augmentation may occlude real-world objects behind the augmentation. In video see-through systems, the same effect may be achieved by compositing the augmentation layer to the foreground. As such, augmentations may occlude real-world content, or vice versa.

As indicated above, when utilizing AR systems, capturing occlusions accurately may be a challenge. Moreover, this may be especially true for AR systems with latency issues. In some aspects, it may be especially difficult to accurately capture a real-world object that is occluding augmented content. An accurate occlusion of real-world content and augmented content may help a user to obtain a more realistic and immersive AR experience.

Figure 2:
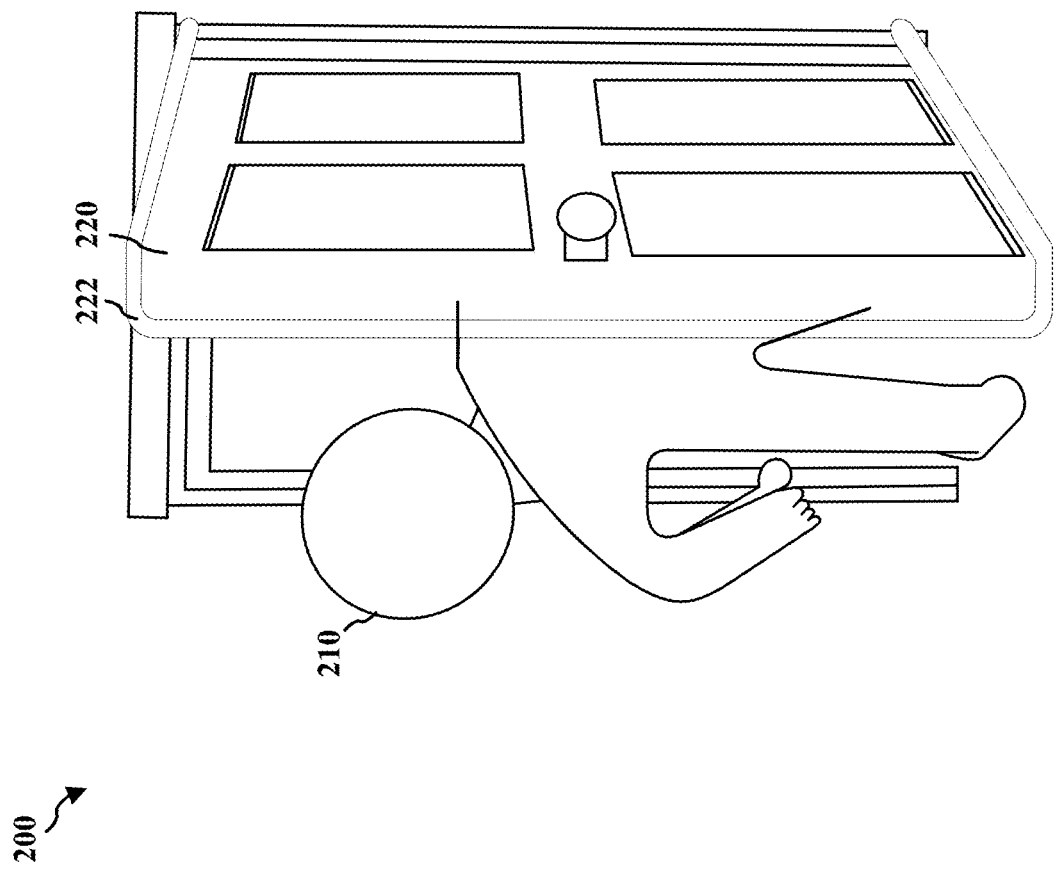
FIG. 2 illustrates an example image or scene in accordance with one or more techniques of this disclosure.

FIG. 2 illustrates an example image or scene 200 in accordance with one or more techniques of this disclosure. Scene 200 includes augmented content 210 and real-world content 220, which includes edge 222. More specifically, FIG. 2 displays the real-world object 220, e.g., a door, that is occluding the augmented content 210, e.g., a person. As shown in FIG. 2, the augmented content 210 slightly overlaps the edge 222 of real-world object 220, even though the real-world object 220 is meant to fully occlude the augmented content 210. For example, a portion of the person slightly overlaps the edge of the door, when the door is meant to completely occlude the person.

As indicated above, FIG. 2 displays that it may be difficult to accurately achieve the effect of real-world content occluding the augmented content in an AR system. As shown in FIG. 2, AR systems may have difficultly accurately reflecting when real-world objects occlude augmented content, or vice versa. Indeed, some AR systems may have difficulty in quickly and accurately processing the edges of two objects when the objects are real-world content and augmented content. Accordingly, there is a need to accurately depict when real-world content occludes augmented content.

In order to accurately simulate real-world content occluding augmented content, or vice versa, the geometry information of the real-world occluding object may be determined. In some instances, this may be achieved by a combination of computer vision techniques, three dimensional (3D) reconstruction, and/or meshing. In one instance, the meshing may run real-time on the client device or HMD and the reconstructed geometry may be transferred to the server or cloud server. In another instance, the client device or HMD may capture images in a sequence and transmit them to the server, which then performs the 3D reconstruction and/or meshing algorithms to extract 3D mesh information about the objects visible in the real-world scene. For instance, in some aspects, a real-world 3D mesh may be determined. Accordingly, the geometry of the occluding object may be available on the client device and sent to the server, or vice versa. This geometric representation may be adjusted and become more precise over time as more observations of the same real-world object or objects become available. By doing so, the mesh and/or information regarding the occluding object may become increasingly precise over time.

In some aspects, in order to obtain a precise depiction of the augmented and real-world content, the augmented content may need to stop precisely at the edge of the real-world content, e.g., if the real-world content is occluding the augmented content. As such, the real-world content that is occluding the augmented content may need to correspond to a part of the augmented content that is not being rendered. As shown in FIG. 2, the overlaid augmented content 210 may need to stop at the edge of the occluding real content 220.

In some instances, aspects of the present disclosure may determine the precise edge of occluding real-world content. Additionally, this edge of real-world content may be determined or known at the time of rendering. By doing so, the augmented content may stop precisely at the edge of the real-world object, which may improve the accuracy of the AR experience.

In some aspects, the aforementioned edge determination may be resolved during a visibility pass, e.g., in a rendering engine. In split AR systems, the rendering engine resides on the server. A visibility pass may consider the pose of all the relevant meshes, e.g., both real-world and augmented meshes in the perspective of the current camera pose and/or determine which triangles are visible from the current camera pose, taking into account the depth of real world geometry as well as the desired depth/placement of the augmented content. In aspects of the present disclosure, the visible triangles on the meshes of real-world objects may be rendered as occlusion materials or represented via occlusion messages, e.g., with (0,0,0) values, and the visible triangles on the meshes of computer graphics objects may be rendered as non-zero pixels, i.e., in color.

In the context of the present disclosure, the term "camera" may be used interchangeably to represent two distinct entities: a computer graphics camera (e.g., a camera object inside a graphics rendering engine) or a real-world observer (e.g., eye of a user wearing an AR device). Whichever variant of the term camera that fits the present usage may be determined based on the content that is being "observed" via the camera, e.g., if real-world content is discussed, the "camera" may represent a real-world observer. Also note that there may be a correspondence between the two types of cameras in XR systems, as the pose of the real-world observer may be used to modify the pose of the graphics rendering engine camera. Moreover, computations discussed in this disclosure may combine real objects and animated objects within the realm of computer graphics world, so that both may be represented within the graphics rendering engine. When this occurs, the two notions of the term "camera" may merge to correspond to a computer graphics camera.

Split XR, AR, cloud gaming systems may also introduce latency when delivering the rendered content to the client display. In some aspects, this latency may be even higher when rendering occurs on a server than compared to client rendering, but it may also enable more complex XR or AR applications. In addition, there may be non-negligible latency between the time a camera pose is computed and the time the content appears on the client display. For instance, a certain amount of latency may always be present in split XR, AR, cloud gaming systems.

The present disclosure may consider two modalities of split XR, AR, cloud gaming architecture: pixel streaming (PS) architecture and vector streaming (VS) architecture. In PS systems, the content latency may be compensated using a variant of asynchronous time-warping on the client prior to the display. In some aspects, in a split XR system, the PS frames that are streamed to the client may be time-warped based on a view transformation between the view used to render the content and the latest view just in time for displaying the same content. For example, aspects of the present disclosure may perform a time compensation reprojection such that the appearance of delayed frames may be determined based on the estimated distance in the camera position and orientation the camera travelled during the period of time compensated for.

The methods for occlusion handling in split/remote rendering AR systems described herein may include techniques specialized for systems where a scene rendered in screen space may be part of the interface between a server and a client. These systems may be referred to as pixel streaming systems. Additionally, the present disclosure may include techniques specialized for systems where the final screen-space rendering may occur on the client whereas the server may provide relevant scene geometry and pose-dependent shading in object space of potentially visible textures. These systems may be referred to as vector streaming systems. The descriptions of these two techniques may be dispersed throughout the present disclosure. A way to determine which system is being described is to consider the interface in the description. For example, an interface (signaling medium) for pixel streaming systems may be billboards, while an interface (signaling medium) for vector streaming systems may be meshes or geometry and a shading atlas for shaded surface textures.

In some instances, asynchronous time-warping (ATW) on the PS client may distort the shape of rendered content or CGI. For instance, ATW may be intrinsically a planar view transformation, whereas most content in CGI scenes may not be planar in nature, and even fewer content surfaces may adhere to co-planar relation where the planes in question are strictly camera-aligned. In some aspects, if a portion of the augmentation is rendered on a server and then sent to a client to finish rendering, the rendered augmentation may undergo a time warping. In these aspects, it may be difficult to retain an accurate occlusion boundary between any real-world objects and the augmentation following the time warping applied on the augmentation only.

In pixel streaming architecture, the server or game engine may determine the pixel information or eye buffer information for a scene and send the pixel information to the client device. The client device may then render the scene based on the pixel information. In some instances, this pixel information or eye buffer information may correspond to a particular pose of the XR camera.

In some aspects, and in split AR systems, the reprojection operation conducted by ATW on the augmented content may also shift the edge of the augmented content relative to an occluding real-world object. For example, in FIG. 2 above, the ajar door 220 appears partially cut off by the person 210. Also, there may be a gap between the partially ajar door 220 and the occluded person 210.

In vector streaming systems, the server may stream the appearance of the augmented or CGI surfaces, as well as the geometry of these augmented objects. In the latter stages of device processing, e.g., prior to transferring information to the display, the client may rasterize the geometry of the visible augmented objects and/or texture-map the corresponding textures from the streamed atlas to the rasterized polygons. This variant of pre-display processing is inherently free of long pose-to-render latencies, and may not distort the shape of the augmented objects. Coupled with a system modification which is a subject of the present disclosure, this variant of pre-display processing is also capable of preserving the accurate boundary between the foreground and background content, and thus, remain an accurate depiction of the mixed reality scene.

In some aspects, the shading atlas information transported within vector streaming systems may be sent as time-evolving textures, and encoded as video. In some aspects, the geometry information may represent the meshes or partial meshes of CGI objects and may be transported raw or encoded using mesh compression methods. The client device may receive both shading atlas information and geometry information corresponding to a headset pose $T_0$ used to render the server frame, it may decode this information, and use it to render the final eye buffer representations of the scene utilizing the most recent pose $T_1$. Since the pose $T_1$ may be much fresher and more up-to-date than pose $T_0$, and since the final rendering step undertaken at pose $T_1$ is proper geometry raster and not an approximation, the described system may be less latency-limiting than that of pixel streaming.

The client may rasterize this shading atlas information and/or geometry information using the most recent pose $T_1$, i.e., convert this information into pixels that may be displayed on the device. Additionally, in some aspects, the server may receive a pose that was streamed from the client device or HMD, and then perform visibility and shading computations based on this received pose $T_0$. Visibility computation affects which meshes or portions of meshes may be sent to the client, and shading computation may include the shading atlas corresponding to the current frame, which is also sent to the client. Aspects of the present disclosure may also assume that the client device has information regarding these meshes or geometry, for example as a result of the offline scene loading step, so that the geometry may not need to be streamed real-time to the client. For example, the server may compute and stream only the shading on object surfaces, e.g., which may change based on the vantage point of the camera or other dynamic elements of the scene, and only this shading information may be streamed to the client in real time.

In some aspects, regardless of whether pixel streaming or vector streaming architecture is used for AR applications, the information about the real-world occluding content and how it affects the background augmentations may be signaled to the client. The present disclosure may signal this information and simplify the client operations while preserving the occluding edge fidelity throughout the latency compensation.

Some aspects of the present disclosure may solve the aforementioned occluding real-world objects in pixel streaming systems by determining depth information about these objects. For instance, a real-world surface may be treated as another mixed reality asset, only using occlusion material as the surface material type and may be streamed to the client device together with some other properties of the real-world asset in order for the client to incorporate it as part of pre-display processing with the aim of preserving the occlusion boundary between real-world and augmented objects close to its ideal appearance. An object with an occlusion material may be treated by a split rendering client as another rendered object, but due to its surface material type it may not be visible at the client display; on the contrary, its silhouette rendered from the pre-display headset pose $T_1$ serves to occlude other augmented objects/assets which may be rendered in the background. Accordingly, aspects of the present disclosure may determine or render values for real-world occluding objects, and attach an occlusion material to these objects. The presence of real-world occluding objects may be signaled for instance to the vector streaming client by including a separate signaling message type for occlusion material patches, and listing the unique patch identifiers of the patches to be rendered using occlusion material.

By including real-world content represented using occlusion materials, the content compositing device may make augmented content precisely stop at the edge of the occluding real-world object regardless of the delay introduced in the split rendering system between the pose $T_0$ and pose $T_1$. Indeed, in order to prevent the augmentation from overlapping the occluding real-world object, the present disclosure may render the foreground real-world content "on top of" the background animation using an occlusion material, which may end up effectively masking the portions of the animation which should be occluded by real-world content. As such, the present disclosure may treat the real-world content as rendered, similar to an animation layer, but a user of an AR device may not be able to view this rendered content as they are actually viewing the real-world content through the "transparent" mask. The purpose of representing a real object surface using the occlusion material at the client may be to act as a "mask" during the pre-display processing stage; a mask which may force the see-through (real world) content to be visible in the corresponding pixels. This concept may help to maintain the sharp boundary between the real-world foreground content and the animated background content.

In some aspects, the pixel information or eye buffer information for a scene may be determined or rendered at the server and sent to client in separate billboards or layers. For example, an augmentation may be determined or rendered and sent to a client in one billboard or layer, and a real-world object may be determined and sent in another billboard or layer. In other aspects, each billboard or layer generated at the server and streamed to the client may contain disjoint planar projections of scene assets (real-world objects or animations) which appear at roughly the same distance/ "depth" from the camera given the most recent camera/ headset pose. In such systems there can be many (e.g., a dozen) different billboards or layers sent to the PS client for pre-display processing.

Figure 3:
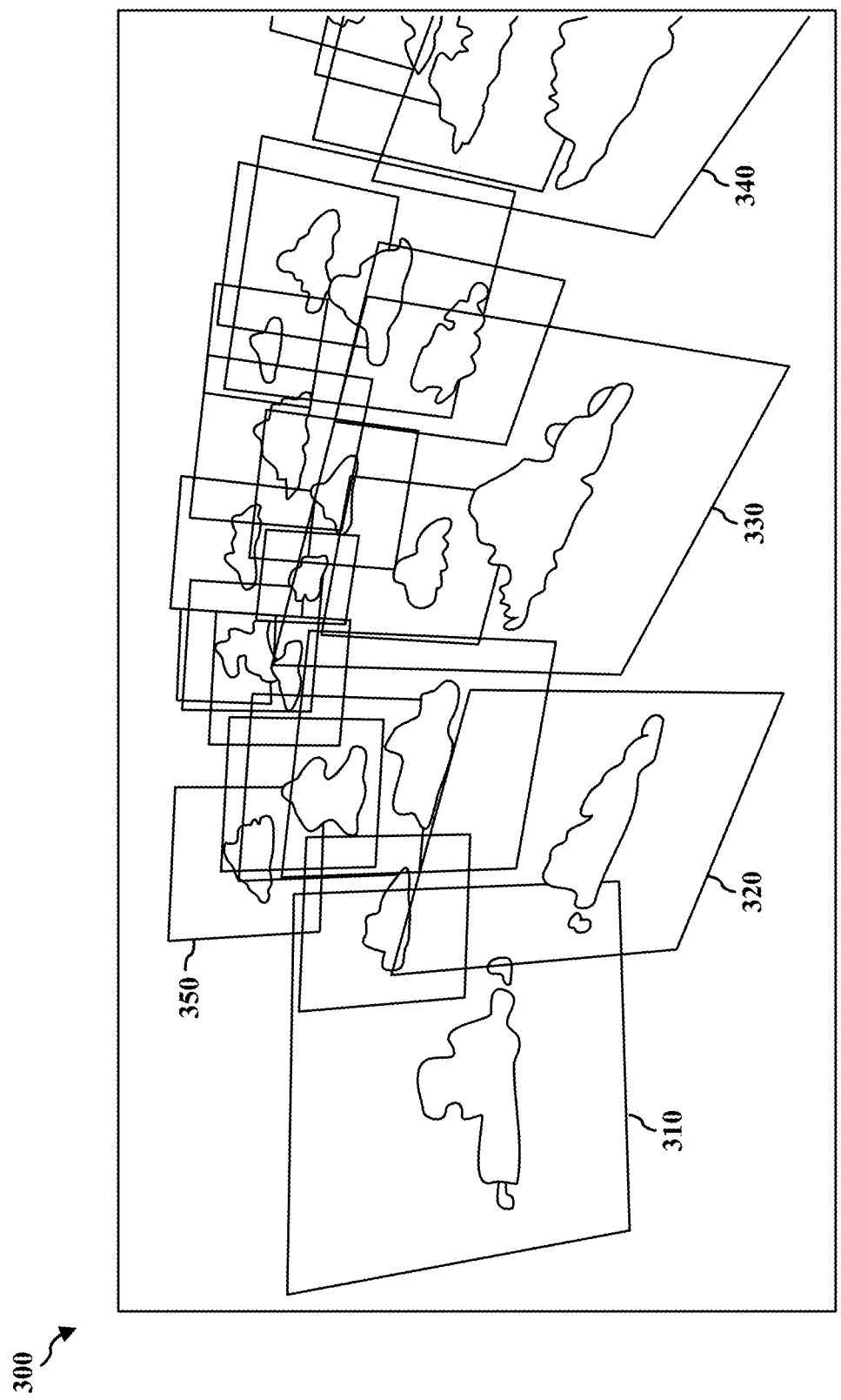
FIG. 3 illustrates an example of depth-aligned billboards in accordance with one or more techniques of this disclosure.

FIG. 3 illustrates example depth-aligned billboards 300 in accordance with one or more techniques of this disclosure. Billboards 300 include billboards or layers 310, 320, 330, 340, 350. As indicated above, billboards 310, 320, 330, 340, 350 may represent different content, such as real-world content or augmented content. In addition, FIG. 3 displays the use of billboards 310, 320, 330, 340, 350, in a pixel streaming architecture.

In some instances, the aforementioned occlusion materials for real-world content may be portrayed using a billboard or layer, and the augmented content may be portrayed using another billboard or layer, while both types of layers may be composited on the client in a back-to-front fashion during pre-display processing. By doing so, the occlusion material real-world content and the augmented content may correspond to separate billboards or layers. These billboards or layers may approximate real-world and animated content in an AR scene, e.g., via their planar renditions.

In some aspects, when an AR camera at the client device moves, these billboards or layers rendered at various depth values may help preserve the occluder/occlusion relationship expected in a mixed reality scene. As such, one or more billboards or layers may correspond to real-world content and one or more other billboards or layers may correspond to augmented content, such that the relative occlusions between real-world and augmented content may remain accurate even as the client pose moves from the pose of content rendering $T_0$ to the pose of content presentation $T_1$.

Additionally, the billboards may correspond to planes at different depths which help preserve the disparity/depth information of various portions of a scene when an AR camera is time-adjusted. Additionally, this depth information on the billboards may implicitly determine which content, e.g., real-world content or augmented content, is occluding other content, by way of content compositing which may be back-to-front. Further, the billboard or layer representation of real-world objects/surfaces may improve the accuracy of the edge or division between real-world content and augmented content regardless of which of the two is the occluder.

In some aspects, real-world objects in a mixed reality scene may be represented on the client as the mesh/geometry describing the location, shape, and size of the objects, as well as the occlusion materials for the corresponding surfaces. For example, mesh representation of the real scene may be determined at a server and the corresponding geometry with the occlusion materials may be sent to a client to perform the rendering for the scene. Moreover, this mesh representation may be determined or known at the server and/or the client. If it is known at the client as well, then none of the information needed for representing the real-world content needs to be transmitted by the server. Moreover, having the real-world meshing capability on the client has its benefits from latency point of view. If the real-world scene is not entirely static (contains moving or deformable objects), than the latency included in the system of meshing the world and bringing the mesh information to the rasterization with occlusion materials may start playing a role. Clients with on-device meshing capability may be at an advantage because their real-world representation component would incur lower latencies, thus corresponding more closely to the actual see-through scene.

At the time of object rendering, the server may need several pieces of information. For instance, the server may need meshes or models of real-world occluding objects, which may then be rendered into a series of billboards or impostors, e.g., in pixel streaming systems, or may be transmitted to the client as meshes accompanied by null surfaces baked into a shading atlas, e.g., in vector streaming systems. In some aspects, a the billboards containing screen-space projections of real-world occluders may be characterized by the corresponding plane parameters: orientation and distance from the camera (depth). Further, billboards or layers that include augmentations and real-world objects may be rendered subject to exact visibility computation, e.g., within frustum, or they may be at least partially over-shaded, e.g., to include portions of the screen-space projection of the objects slightly outside the frustum or not exactly visible form current viewpoint due to occlusion from other objects. At the client side, the billboards or layers may be rendered or composed back-to-front and ordered by depth.

Depending on the network and processing latency, the environment meshing may be done entirely on the cloud (e.g., uplink data is real-time video feed and IMU data captured on a client), partially on the cloud and partially on the client (e.g., uplink data may include some key frames, accompanying meta-data, and other environment descriptors extracted locally on the client), or entirely on the client (e.g., the client may send some high-level meshing attributes to the server, but generally maintains meshing properties locally). These options may offer various trade-offs between compute offload (from client to the edge server or the cloud) and traffic requirements (from highest to moderate).

In some instances of pixel streaming systems, assuming augmentations are rendered on billboards with at least some over-shading beyond strict visibility, and if most objects are not too close to the display camera, the method for portraying real-world occluders to the client display may tolerate some latency and camera motion without drastically distorting the occlusion boundaries. Also, the relative motion accumulating on the client between the head-pose used for rendering and the head-pose at the time of display may affect the quality of the composed content. For example, the combination of AR camera movement and the network latency may affect the accuracy of the rendered content.

In some instances of pixel streaming systems, each real and/or augmented object may utilize a separate billboard or layer. This may complicate server and client processing and inflate downlink traffic. In some aspects of the present disclosure, the server may identify or tag the real-world objects that partially intersect the frustum toward an augmented object and are between the camera and the augmentation. The remaining real-world objects may not be explicitly signaled on the downlink, thus conserving the transmission bandwidth and corresponding client processing.

Additionally, billboards or impostors that describe the real-world objects may trace a contour of these objects from the viewpoint of the rendering pose $T_0$. In some aspects, when ATW is applied at the client as a means of latency compensation, the signaled contour of the real-world occluding objects may be adjusted or "stretched" proportional to the pose offset $T_1$-$T_0$ and may not correspond to the occluding object contour from the latest viewpoint, which may be different or more advanced compared to the one signaled for the purpose of billboard rendering. This may lead to an unnatural appearance of the occlusion edge between the real-world foreground and the augmentation background. Moreover, under certain conditions, the perceived occlusion boundary may move with respect to the foreground object, which may also appear unnatural.

Most of these shortcomings may be naturally resolved in the methodology proposed for the vector streaming systems. In such systems the client performs the final rasterization of mixed scene objects—animations and real-world ones—onto the display screen, e.g., using the latest client pose. Since the rasterization may use 3D meshes/geometry of raw assets as inputs, shape distortion issues and/or the issue of a distorted/moving occlusion boundary may not be present as long as the geometric meshes for the real-world and augmented objects are accurately presented at the client. Besides meshes/geometry of the potentially visible actors in a mixed reality scene, the client may also receive the corresponding shaded surfaces packed in a shading atlas.

Figure 4A:
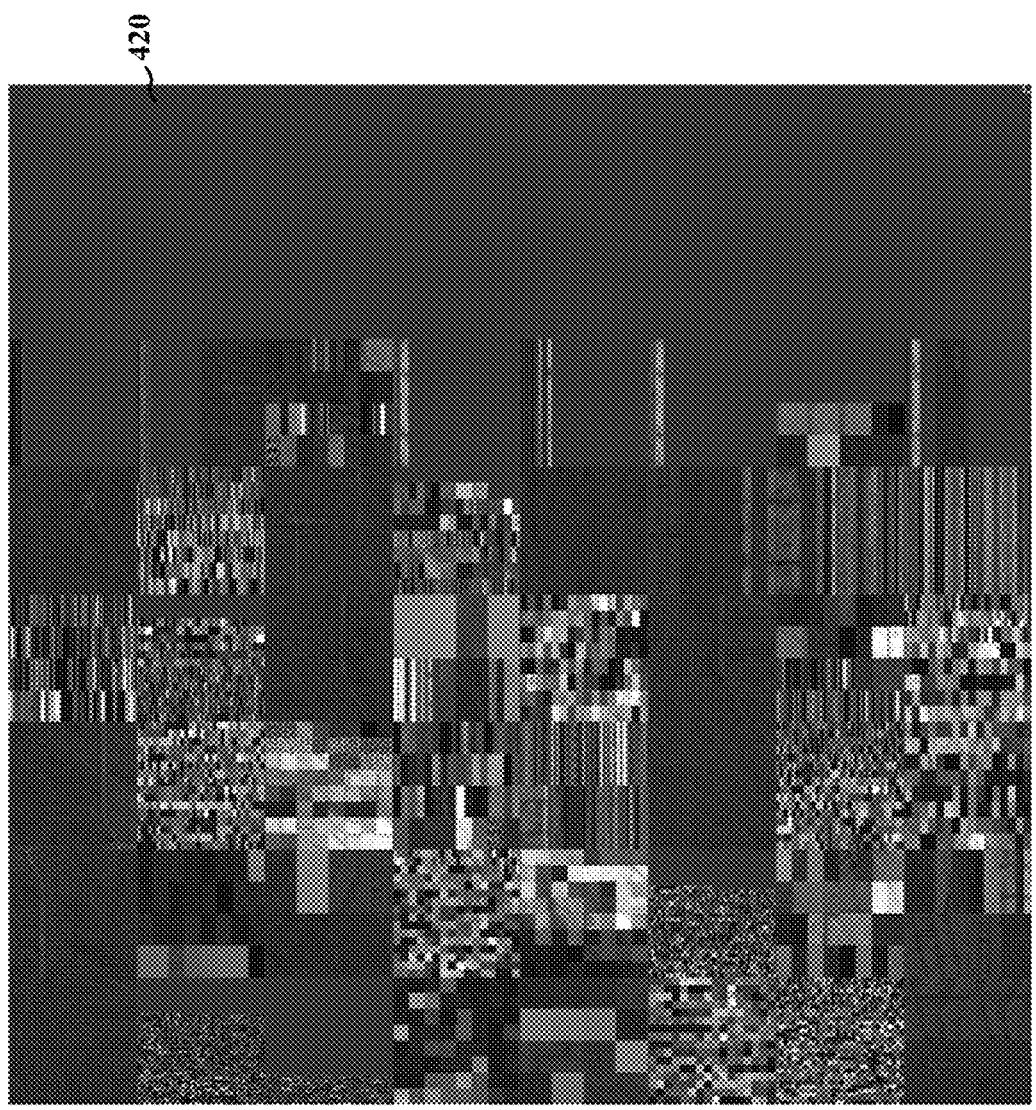
FIG. 4A illustrates an example shading atlas in accordance with one or more techniques of this disclosure.

FIG. 4A illustrates shading atlas 400 in accordance with one or more techniques of this disclosure. As shown in FIG. 4A, shading atlas 400 illustrates an efficient way of storing textures that are in object space, rather than in image space. FIG. 4A also shows that different portions of shading atlas 400 are shaded at different resolutions, e.g., depending on a distance from a camera the shaded textures need to be portrayed with more or less level of detail. Also, the dark gray portions of shading atlas 400, e.g., shade 420 on the far right side of FIG. 4A, may represent unallocated portions of the shading atlas 400. In some instances, shading atlas 400 may be efficiently encoded based on a high temporal coherence. For example, one block in shading atlas 400 may represent the same physical surface in a mixed reality world. In some aspects, the blocks in the shading atlas 400 may remain in the same place for as long as they are potentially visible and occupying a similar area in a screen space.

Figure 4B:
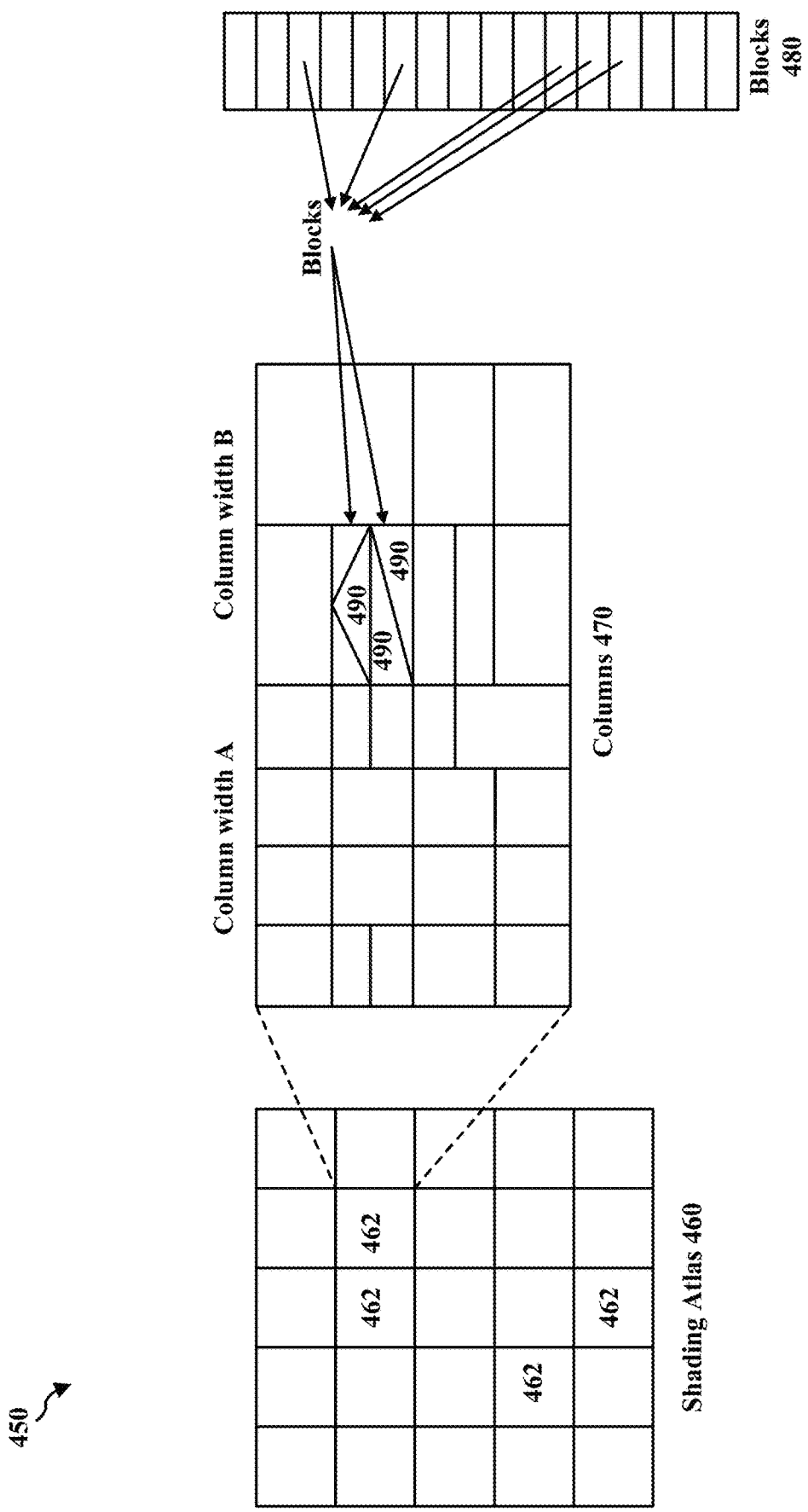
FIG. 4B illustrates an example shading atlas organization in accordance with one or more techniques of this disclosure.

FIG. 4B illustrates shading atlas organization 450 in accordance with one or more techniques of this disclosure. As shown in FIG. 4B, shading atlas 460 includes superblocks 462, with each superblock including columns 470. Columns of a certain width may be allocated in a same superblock, where the columns include column width A and column width B. Each column may further include blocks 480. In some aspects, as illustrated in shading atlas organization 450, column width A may be half the value of column width B. As shown in FIG. 4B, shading atlas organization 450 from large to small values may be superblocks 462 to columns 470 to blocks 480. FIG. 4B illustrates how blocks 480 are packed efficiently into shading atlas 460. Moreover, this hierarchy of memory management allows for extensive parallelism when deciding the mapping from blocks 480 to corresponding places in a shading atlas 460.

The memory organization of the shading atlas may be as follows. The atlas includes superblocks which are further divided into columns (of equal width), and each column includes stacked blocks. Blocks are of rectangular shape (square being a special case), and they include a fixed number of triangles, e.g., triangles 490. This is shown in the portion of FIG. 4B depicting the columns of width B where a few blocks are shown to include a number of triangles, e.g., triangles 490. For example, this number may be 1, 2, or 3. In some implementations block constellations including more than 3 triangles may also be possible. The triangle-to-block assignment is chosen once during asset loading and scene preprocessing (e.g., performed offline) and beyond that point it remains fixed for the duration of the game. In some aspects, the triangle-to-block mapping operation is separate from the online memory organization of blocks into shading atlas, as depicted in FIG. 4B. In one instance, the triangles assigned to one block may be chosen such that they are neighbors in the object mesh, their aspect ratios may be "compatible" to the chosen block constellation, their sizes/areas may be similar, and their surface normals may be similar. The triangle-to-block assignment may be based purely on mesh properties, thus in the object space and as such may be done before the game starts. As opposed to that, the assignment of blocks to superblocks may change over time and be tightly coupled with the object appearance in screen space, and as such it depends on the camera position and orientation. There are several factors dictating whether a block will appear in the atlas, and if so in which superblock. Firstly, a block is initiated into a shading atlas once it becomes a part of the potentially visible set. This roughly means that the block is added for the first time once it may be revealed by camera moving near the present location. The initial superblock assignment for the added block depends on the block appearance in screen space. The blocks which are closer to the camera appear bigger in screen space and thus get allocated a larger portion of the atlas real estate. Also, blocks which appear at large incident angles with respect to the camera axis may appear slanted and as such may be represented in an atlas by a block with high aspect ratio (e.g., a skinny rectangle). Depending on camera motion, the triangle appearance in screen space may gradually change, and consequently the corresponding block's size and aspect ratio may change too. In instances of shading atlas organization where the column widths are restricted to powers of two, there may be a restricted number of block sizes and aspect ratios which are available in the atlas, and so the switch of a block from one column-width superblock to another may not be very frequent or continuous in time.

In order to preserve the aforementioned temporal coherence within the atlas a block, once added to the atlas, may be restricted to occupy the same place for as long as possible subject to some constraints. However, its location in an atlas may change once: (i) its screen space area and aspect ratio become increasingly inappropriate for the current superblock column width, so the switch becomes necessary, or, (ii) the block ceases to be in the potentially visible set for a prolonged period of time. In both these situations the block in question may be moved within the atlas or removed altogether—specifically in case (ii). The change may result in a temporary increase in the encoded bitrate, but the new state may persist a while leading to overall lowering the encoded bitrate. In order to facilitate fast memory lookups, both horizontal and vertical block sizes are kept as powers of two. For instance, a block may be 16 pixels tall and 64 pixels wide. This block would get assigned to a superblock containing blocks which are all 64 pixels in width. When the headset position changes so that the block's aspect ratio appears much closer to 1:2, and slightly larger in size, the block will be removed from its current location, and it may be assigned 32 pixels in heights and 64 pixels in width. In this case, it may again be allocated to a superblock of width 64, but it would need to change its place.

In the proposed method for portraying information about real-world occluders to a vector streaming client, it is proposed to stream the corresponding meshes/geometry as with the rest of the geometry sent on the downlink, e.g., the geometry of the animated objects. The resulting real-world polygons may need to be accompanied by corresponding occlusion material messages in systems where split rendering client supports occlusion material rendering. In clients not supporting occlusion material rendering the corresponding polygon surfaces need to be portrayed as textures in the shading atlas. As mentioned above, these textures rendered into the shading atlas may be uniformly black, a (0,0,0) value, null textures, since in some instances rendering a (0,0,0) value on an augmented reality display may result in the corresponding area being treated as completely transparent or see-through. Moreover, since the shaded textures for those particular objects may be uniform in color, their resolution may not adhere to the conventional restrictions that the polygons appearing closer to the camera in 3D scene may be represented by textures of a higher resolution—i.e., larger rectangles in a shading atlas. In other words, the polygon textures of real-world objects in a mixed reality scene may be represented by small rectangles shaded using uniform null textures. In some aspects, the small rectangles may be 2 pixels by 2 pixels in size, i.e., squares with 2 pixels in each dimension.

Moreover, some vector streaming systems which do not support occlusion material rendering on the client may support a special message format for describing uniformly colored polygons, which may be referred to as single-color messages. These messages may be sent instead of explicitly shading uniformly black squares in the shading atlas, and may include a header indicating that a single-color message is being sent, followed by the number of unique surface pieces which are being mapped to the same color. The body of the message may describe the uniform color—which in the case of occluding surfaces is the (0,0,0) black color. This may be followed by enumerating all parts of textures (patches/triangles) which may take on the described color. This enumeration is facilitated using the unique unit surface identifier. For example, all patches present in a mixed reality scene are assigned a unique patch ID, and these patch IDs may be included in the single-color messages. This transmission scheme may be more efficient from a bitrate, memory, and/or latency point of view than the scheme where the (0,0,0) color information is explicitly signaled as a separate rectangle in a shading atlas. Also, certain surfaces may be described using single-color messages which is an alternative to rendering them explicitly in the shading atlas. These single-color messages may eliminate most redundancies and inefficiencies of describing all uniform-colored surfaces using standard video compression by simple removing them from the video altogether.

In some instances, a vector streaming client may remain agnostic to the presence of real-world occluding objects. For instance, there may be no difference in the client operation when processing AR applications with real-world occlusions or AR applications without real-world occlusions. Vector streaming approach to novel view synthesis step present in all split rendering systems as part of pre-display processing may offer an improved performance compared to asynchronous time warp (ATW) and similar approaches to novel view synthesis which may be present in pixel streaming based split rendering systems. The vector streaming—based novel view synthesis avoids planar reprojection based shape distortion and occlusion boundary shifts/distortions by re-rendering the entire potentially visible geometry from a novel viewpoint. In some aspects, if uplink traffic is delayed or interrupted, or assuming on-client meshing, the client device may reconstruct the appearance and geometry of the occluding real-world object locally and may then add the corresponding meshes and all-zero value textures to the existing list of draw calls. In such way, vector streaming clients with meshing capability may offer more robustness to unstable communication link, and may also provide a solution with lower overall latency for incorporating the real-world objects in a complex mixed reality experiences. In some aspects, the occluding object mesh available locally (using client reconstruction) may not be greatly refined, and may need bundle adjustment at the server in order to make it more precise and adhere to the actual real-world geometry. However, in some aspects, the coarse version of the real-world occluder may still be selected over not having any such representation in case of long network delays or service interruptions.

In some aspects, if the throughput is slow or the latency is high, the client may have the option of using local meshes, e.g., for real-world content, rather than meshes from the server. By using local meshes, the client may render this mesh content at the client and not wait to receive meshes from the server. This may provide a more immediate response to real-world occlusions. For example, local client meshes may be useful for real-world content detected by the client, but not yet known to the server.

The client device may also perform a crude real-world meshing and send this information to the server. The server may then perform a bundle adjustment, such that the server compares the real-world observations of the real object made by a client at many distinct points in time, and refines this information into a single compact refined mesh information for future representation of real-world objects. Accordingly, real-world content refinement may occur on both the client or the server.

In some instances, the client device may utilize an additional pass for rendering the occluding objects unknown to the server, e.g., using the latest real-world object meshes and poses. This condition may be detected on the client if flagged occluding objects do not appear in the downlink data. Also, the client may operate self-sufficiently, e.g., without input from the server, even in the presence of occluding objects and/or no reliable communications network service.

As indicated above, aspects of the present disclosure may handle occluding objects in pixel streaming systems by rendering occluding objects via layers or billboards. For instance, the present disclosure may determine which real-world objects may be occluding objects via a geometry comparison with augmented objects in a mixed reality space. For example, geometry of real-world objects (e.g., detected and meshed in world coordinate system tied to an arbitrary point in the real world) may be "translated" to mixed world coordinates dictated by animated objects by using the pose of a common subject between the two worlds: the camera. After this, a variant of a standard visibility test may be performed in the mixed world representation in order to tag select real-world objects as potential occluders. Real-world objects which partially overlap in pixel space with animations and appear closer to the virtual camera than at least one augmented object may be tagged as potential occluders and rendered onto a separate billboard using the latest known object mesh. These occluding objects may be rasterized onto a billboard plane at an average object distance from the AR camera (or using some other method to determine plane distance and orientation with respect to the camera). The object surface in the billboard may be rendered using all-zero pixels, e.g., an RGB value of (0,0,0).

Additionally, the present disclosure may handle occluding objects in vector streaming systems similar to other objects. Real-world objects with known meshes may be treated the same way as animated objects at the server. As such, these real-world objects may participate in a visibility computation. If a real-world object is found to occlude at least one animated object, the present disclosure may treat this real-world object as an active occluding object and add the corresponding information to a combined set of known objects. The present disclosure may also transmit the potentially visible geometry or textures of these objects as a message with a single-color value or an RGB value of (0,0,0). As mesh information of these objects may continue to be refined on the server, the present disclosure may send updates regarding the object geometry.

As indicated herein, the present disclosure may also include estimating the geometry of the real-world occluding objects locally on the client device (and not on the server) when received messages from the server do not include information about these occluding objects. This situation may occur due to a number of different reasons, e.g., in order to reduce combined system latencies, due to uplink temporary disruptions, and/or the limits on server workload. In the present disclosure the vector streaming client may add locally estimated meshes of real-world objects to the list of meshes rasterized on the client, using all-zero values for the corresponding textures. Moreover, the pixel streaming client may rasterize the locally-estimated meshes in a separate pass, before combining the result with the pixel streaming textures received over the network. So in pixel streaming systems, the present disclosure may utilize one or more solutions to solve real-world content occluding augmented content. And in vector streaming systems, the present disclosure may utilize multiple solutions to solve real-world content occluding augmented content.

Figure 5:
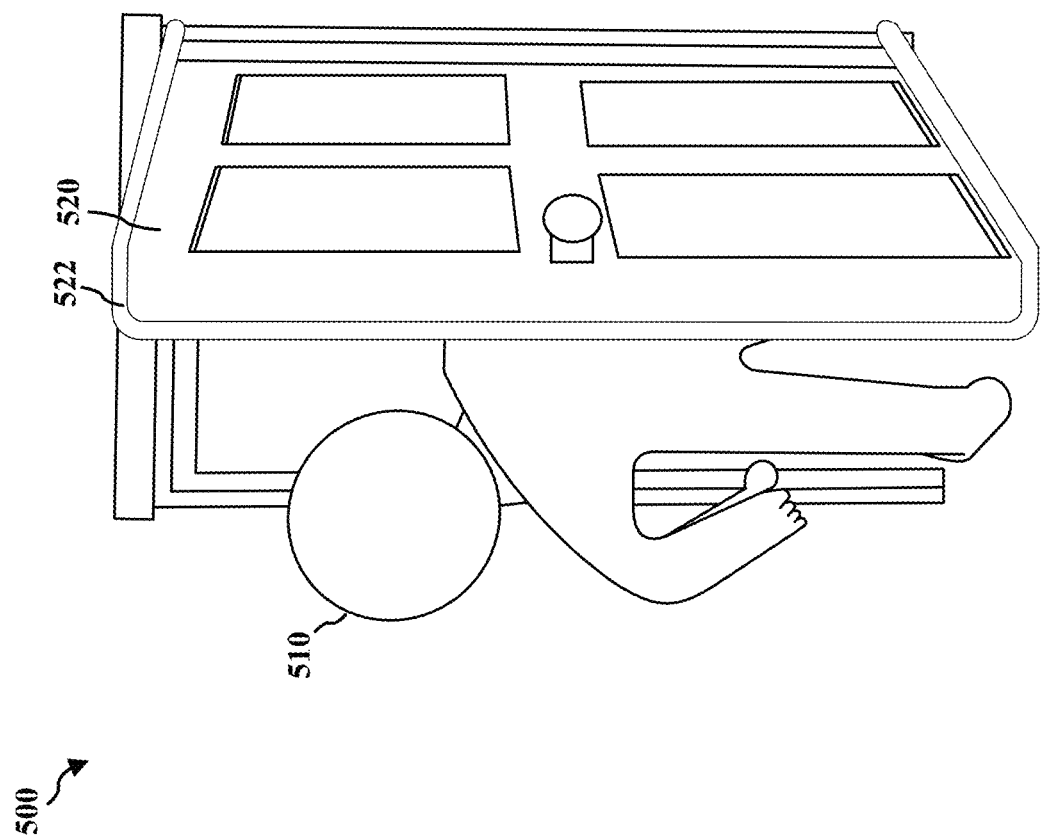
FIG. 5 illustrates an example image or scene in accordance with one or more techniques of this disclosure.

FIG. 5 illustrates an example image or scene 500 in accordance with one or more techniques of this disclosure. Scene 500 includes augmented content 510 and real-world content 520, which includes edge 522. More specifically, FIG. 5 displays the real-world object 520, e.g., a door, that is occluding the augmented content 510, e.g., a person. As shown in FIG. 5, the augmented content 510 stops at the edge 522 of real-world object 520, as the real-world object 520 completely occludes the augmented content 510. For example, no portion of the person 510 overlaps the edge 522 of the door 520.

As indicated above, FIG. 5 accurately displays the effect of real-world content, e.g., content 520, occluding augmented content, e.g., content 510, in an AR system. As shown in FIG. 5, aspects of the present disclosure may accurately determine which real-world objects and animated objects may occlude the other when the two completely or partially overlap in screen space. Moreover, aspects of the present disclosure may render the contents of a mixed reality scene in split rendering architectures such that the occlusion boundaries between the occluding/foreground objects and the occluded/background objects, when the objects are real-world content and augmented content, remain sharp and accurate through a range of network latencies and camera motions. As such, aspects of the present disclosure may accurately depict when real-world content completely or partially occludes augmented content, or when augmented content occludes real-world content, and how or where the boundary between the two may be depicted in AR displays.

FIG. 5 illustrates an example of the aforementioned processes for handling occluding content in split rendering with real-world content and augmented content. As shown in FIG. 5, aspects of the present disclosure, e.g., servers and client devices herein, may perform a number of different steps or processes to render in an immersive fashion mixed reality scenes where real-world and augmented content coexists and interacts with each other. For instance, servers and client devices herein may identify a first content group, among the real-world objects, e.g., door 520 in FIG. 5, and a second content group, among the animated objects, e.g., person 510 in FIG. 5, in a scene. Servers and client devices herein may also determine based on their position in the frustum whether one may potentially occlude the other (partially or completely) from the current camera pose or a nearby camera pose, and for potential occluders/occludes represent their appearance and geometric properties in such way that the occlusion boundary between the two may appear accurate when the mixed scene is re-rendered, e.g., from a dense set of nearby camera poses and orientations. In some aspects, the first content group, e.g., door 520, may include at least some real content and the second content group, e.g., person 510, may include at least some augmented content. Servers and client devices herein may also determine whether at least a portion of the first content group, e.g., door 520, occludes or potentially occludes at least a portion of the second content group, e.g., person 510.

In some aspects, the first content group, e.g., door 520, may be represented using at least one first billboard, e.g., billboard 320 in FIG. 3, and the second content group, e.g., person 510, may be represented using at least one second billboard, e.g., billboard 310 in FIG. 3. Servers and client devices herein may also generate the at least one first billboard, e.g., billboard 320, in accordance with at least one first plane equation and the at least one second billboard, e.g., billboard 310, in accordance with at least one second plane equation. In some aspects, the determination whether at least a portion of the first content group occludes or potentially occludes at least a portion of the second content group may be based on at least one of a current camera pose, one or more camera poses with nearby positions or orientations, or one or more predicted camera poses including near future poses. Additionally, the at least one first billboard, e.g., billboard 320, may be positioned and oriented in correspondence to a first plane and the at least one second billboard, e.g., billboard 310, in correspondence to a second plane.

In some aspects, the first content group, e.g., door 520, may be represented using at least one first mesh and at least one first shading texture, and the second content group, e.g., person 510, may be represented using at least one second mesh and at least one second shading texture. Servers and client devices herein may also generate the at least one first mesh and one first shading texture, and the at least one second mesh and one second shading texture.

Servers and client devices herein may also render the first content group, e.g., door 520, and the second content group, e.g., person 510, based on the determination whether at least a portion of the first content group may occlude at least a portion of the second content group from the current or a nearby camera position and orientation. In some aspects, the pixels in AR headsets where nothing is rendered may behave the same as if the rendered value is (0,0,0), i.e., those pixels remain completely transparent for the real-world content, in the sense that a viewer may "see through" these pixels. Alternatively. client devices herein may render at least a portion of one or more surfaces of the first content group using an occlusion material surface property when the at least a portion of the first content group occludes the at least a portion of the second content group. In some aspects, the at least one first mesh may be associated with first geometry information and the at least one second mesh may be associated with second geometry information.

Servers and client devices herein may also communicate information associated with the first content group, e.g., door 520, and information associated with the second content group, e.g., person 510, to a client device. In some aspects, the client device may undertake processing which is undistinguishable for the elements of the first content group, e.g., door 520, and the elements of the second content group, e.g., person 510. In some aspects, the client device may process the information associated with the first content group and the information associated with the second content group when at least one eye buffer is composited for display. Additionally, the representation of the first content group, e.g., door 520, and the second content group, e.g., person 510, may be at least partially prepared by a server. Further, the representation of the first content group, e.g., door 520, and the second content group, e.g., person 510, may be at least partially rendered by a client device, e.g., into the eye buffers for display. In some aspects, the first content group may be represented using one or more first mesh elements and one or more first pixels, and the second content group may be represented using one or more second mesh elements and one or more second pixels. In some aspects, the first content group may be represented by one or more first occlusion messages.

In some aspects, the first content group, e.g., door 520, may include one or more pixels and a second content group, e.g., person 510, may be represented by one or more pixels. Also, the scene, e.g., scene 500, may be composited and/or generated on a display located at a client device in at least one of a split augmented reality (AR) architecture, a split extended reality (XR) architecture, or a cloud gaming with a server. Further, the determination whether at least a portion of the first content group, e.g., door 520, occludes or potentially occludes at least a portion of the second content group, e.g., person 510, may be at least partially performed by a GPU or a CPU. In some aspects, the rendering the at least a portion of one or more surfaces of the first content group using an occlusion material when the at least a portion of the first content group occludes the at least a portion of the second content group may be at least partially performed on a server.

As indicated above, aspects of the present disclosure utilizing pixel streaming systems may include billboards, impostors, or layers, and real-world content may be rendered as an all-null/black silhouette mask into corresponding billboards using the current camera pose. Aspects of the present disclosure utilizing vector streaming systems may also include a client device that processes the information representing real-world content and animated content in precisely the same way. For example, each real-world occluding object may be assumed to be known at the server. Moreover, each real-world occluding object may be assumed to be at least partially represented by the messages that are sent to the client. In certain aspects, the modality of representing the real-world content within the real scene embedded in the transmitted messages may be identical to the modality of representing the animated content in a virtual/mixed reality scene. Indeed, the client device may not make any distinction regarding which representation corresponds to an augmentation or a real-world object.

Additionally, aspects of the present disclosure may include vector streaming architecture where the server may not be aware of a real-world occluding object, and/or the downlink traffic reaching the client may not contain information about the occluding object, but the client device may be aware of the real-world occluding objects: their shape, size, and pose with respect to the camera/observer. In these instances, the client device may have a separate rendering pass, where the client rasterizes the mesh of the real-world occluding object, rendering its textures using the occlusion material. For example, it may take several frames for the server to become aware of an occluding object, but the client may become aware of the occluding object within a single frame. Thus, the client device may determine the occluding object geometry faster than the server, such that the presence of the occluding object may be portrayed more quickly and minimize the occurrences of obviously incorrect occlusions.

Figure 6:
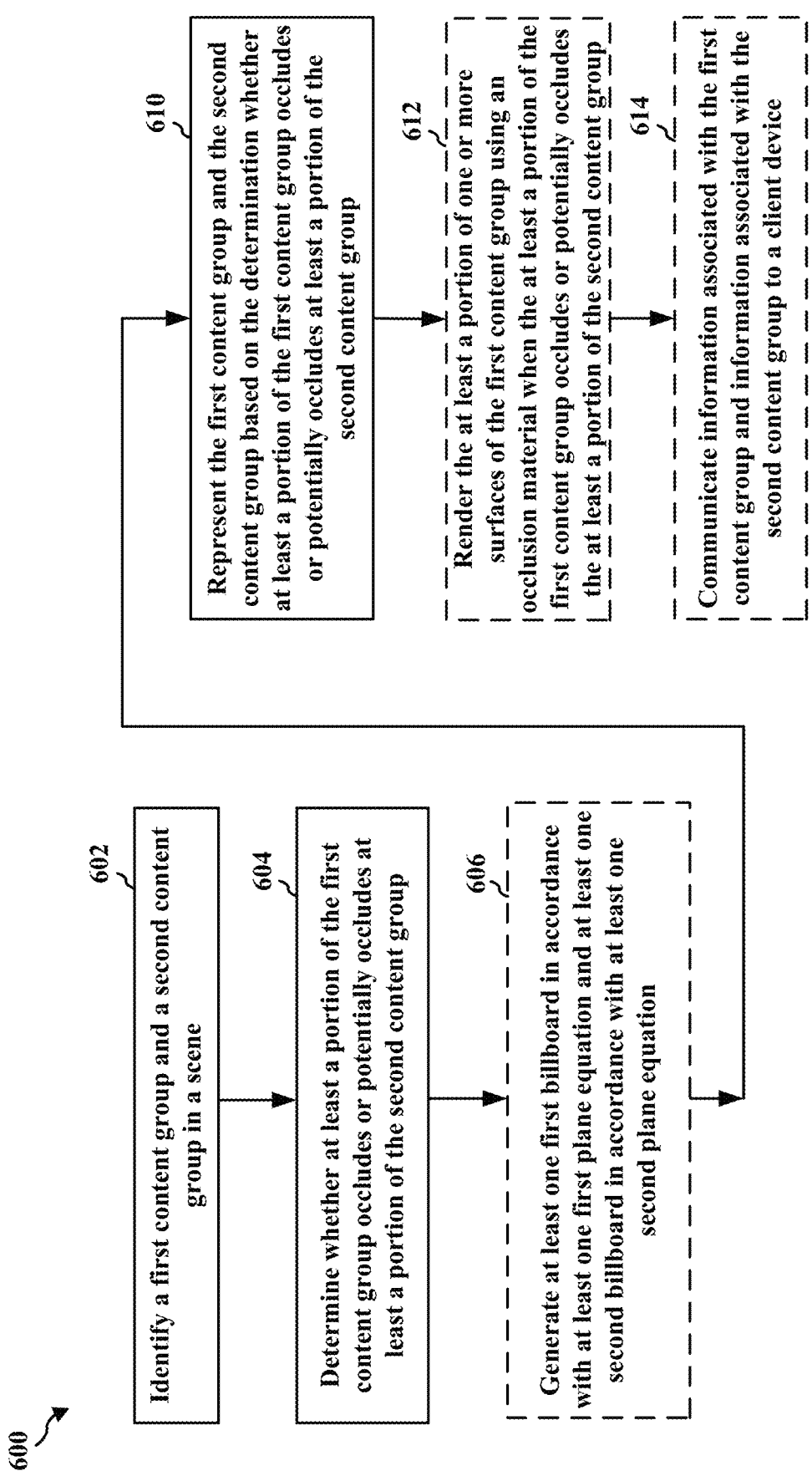
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by an apparatus such as a server, a client device, a CPU, a GPU, or an apparatus for graphics processing. At 602, the apparatus may identify a first content group and a second content group in a scene, as described in connection with the examples in FIGS. 2, 3, 4, and 5. In some aspects, the first content group may include at least some real content and the second content group may include at least some augmented content, as described in connection with the examples in FIGS. 2, 3, 4, and 5.

At 604, the apparatus may determine whether at least a portion of the first content group occludes or potentially occludes at least a portion of the second content group, e.g., from the present or a nearby camera pose, as described in connection with the examples in FIGS. 2, 3, 4, and 5.

In some aspects, if the cross-content occlusion may happen, the first content group may be represented using at least one first billboard. The second content group may be represented using at least one second billboard, as described in connection with the examples in FIGS. 2, 3, 4, and 5. At 606, the apparatus may generate the at least one first billboard in accordance with at least one first plane equation and the at least one second billboard in accordance with at least one second plane equation, as described in connection with the examples in FIGS. 2, 3, 4, and 5. In some aspects, the determination whether at least a portion of the first content group occludes or potentially occludes at least a portion of the second content group is based on at least one of a current camera pose, one or more camera poses with nearby positions or orientations, or one or more predicted camera poses including near future poses, as described in connection with the examples in FIGS. 2, 3, 4, and 5. Additionally, the at least one first billboard may correspond to a first plane and the at least one second billboard may correspond to a second plane, as described in connection with the examples in FIGS. 2, 3, 4, and 5.

In some aspects, the first content group may be represented using at least one first mesh and a first shading texture, and the second content group may be represented using at least one second mesh and a second shading texture, as described in connection with the examples in FIGS. 2, 3, 4, and 5.

At 610, the apparatus may represent the first content group and the second content group based on the determination whether at least a portion of the first content group occludes or potentially occludes at least a portion of the second content group, as described in connection with the examples in FIGS. 2, 3, 4, and 5. At 612, the apparatus may render at least a portion of one or more surfaces of the first content group using an occlusion material when the at least a portion of the first content group occludes or potentially occludes the at least a portion of the second content group, as described in connection with the examples in FIGS. 2, 3, 4, and 5.

In some aspects, the first content group may be represented by a first shading atlas and the second content group may be based on a second shading atlas, as described in connection with the examples in FIGS. 2, 3, 4, and 5. In addition, the at least one first mesh may be associated with first geometry information and the at least one second mesh may be associated with second geometry information, as described in connection with the examples in FIGS. 2, 3, 4, and 5.

At 614, the apparatus may communicate information associated with the first content group and information associated with the second content group to a client device, as described in connection with the examples in FIGS. 2, 3, 4, and 5. In some aspects, the client device may process the information associated with the first content group and the information associated with the second content group, e.g., when at least one eye buffer is composited for display, as described in connection with the examples in FIGS. 2, 3, 4, and 5. Additionally, the representation of the first content group and the representation of the second content group may be at least partially shaded on a server, as described in connection with the examples in FIGS. 2, 3, 4, and 5. Further, the first content group and the second content group may be at least partially rendered by a client device, as described in connection with the examples in FIGS. 2, 3, 4, and 5.

In some aspects, the first content group may include one or more pixels and a second content group may include one or more pixels, as described in connection with the examples in FIGS. 2, 3, 4, and 5. In some aspects, the first content group may be represented by one or more first occlusion messages, as described in connection with the examples in FIGS. 2, 3, 4, and 5. In some aspects, the first content group may be represented using one or more first mesh elements and one or more first pixels, and the second content group may be represented using one or more second mesh elements and one or more second pixels, as described in connection with the examples in FIGS. 2, 3, 4, and 5. Also, the scene may be rendered on a display located at a client device in at least one of a split augmented reality (AR) architecture, a split extended reality (XR) architecture, or a cloud gaming with a server, as described in connection with the examples in FIGS. 2, 3, 4, and 5. Further, the determination whether at least a portion of the first content group occludes or potentially occludes at least a portion of the second content group, e.g., from a present or nearby camera positions and orientations, may be at least partially performed by a GPU or a CPU, as described in connection with the examples in FIGS. 2, 3, 4, and 5.

In some aspects, the determination whether at least a portion of the first content group occludes or potentially occludes at least a portion of the second content group may be at least partially performed on a server, as described in connection with the examples in FIGS. 2, 3, 4, and 5. Also, rendering the at least a portion of one or more surfaces of the first content group using an occlusion material when the at least a portion of the first content group occludes or potentially occludes the at least a portion of the second content group may be at least partially performed on a server, as described in connection with the examples in FIGS. 2, 3, 4, and 5.

In one configuration, a method or apparatus for graphics processing is provided. The apparatus may be a server, a client device, a CPU, a GPU, or some other processor that may perform graphics processing. In one aspect, the apparatus may be the processing unit 120 within the device 104, or may be some other hardware within device 104 or another device. The apparatus may include means for identifying a first content group and a second content group in a scene. The apparatus may also include means for determining whether at least a portion of the first content group occludes or potentially occludes at least a portion of the second content group. The apparatus may also include means for representing the first content group and the second content group based on the determination whether at least a portion of the first content group occludes or potentially occludes at least a portion of the second content group. The apparatus may also include means for rendering the at least a portion of one or more surfaces of the first content group using an occlusion material when the at least a portion of the first content group occludes the at least a portion of the second content group. The apparatus may also include means for generating the at least one first billboard in accordance with at least one first plane equation and a first shading texture, and the at least one second billboard and a second shading texture in accordance with at least one second plane equation. The apparatus may also include means for communicating information associated with the first content group and information associated with the second content group to a client device.

The subject matter described herein may be implemented to realize one or more benefits or advantages. For instance, the described graphics processing techniques may be used by a server, a client, a GPU, a CPU, or some other processor that may perform graphics processing to implement the split rendering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize a split rendering process that may increase the accuracy of handling occluding content in split rendering with real-world content and augmented content.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing at a client device, comprising:
   receiving, from a server, information associated with a first content group in a scene and information associated with a second content group in the scene, wherein at least a portion of the first content group occludes or potentially occludes at least a portion of the second content group; and
   rendering the first content group and the second content group based on the information associated with the first content group and the information associated with the second content group.

2. The method of claim 1, wherein the first content group includes at least some real content and the second content group includes at least some augmented content.

3. The method of claim 1, wherein rendering the first content group and the second content group further comprises:
   rendering at least a portion of one or more surfaces of the first content group using an occlusion material when the at least the portion of the first content group occludes or potentially occludes the at least the portion of the second content group.

4. The method of claim 1, wherein the information associated with the first content group comprises at least a first billboard and the information associated with the second content group comprises at least a second billboard, and wherein the first content group is rendered using at least the first billboard and the second content group is rendered using at least the second billboard.

5. The method of claim 1, further comprising:
   generating a first billboard in accordance with at least one first plane equation and a second billboard in accordance with at least one second plane equation, wherein the first content group is rendered using the first billboard and the second content group is rendered using the second billboard.

6. The method of claim 1, wherein the first content group is rendered using at least one first mesh and a first shading texture, and the second content group is rendered using at least one second mesh and a second shading texture.

7. The method of claim 6, wherein the at least one first mesh is associated with first geometry information and the at least one second mesh is associated with second geometry information.

8. The method of claim 6, wherein the second content group is rendered using either an occlusion material surface property or using all-black pixels of RGB value (0,0,0).

9. The method of claim 1, wherein rendering the first content group and the second content group is performed when at least one eye buffer at the client device is composited for display.

10. The method of claim 1, wherein at least one of the information associated with the first content group or the information associated with the second content group comprises a partial rendering of the corresponding first content group or second content group.

11. The method of claim 1, wherein the first content group is rendered using one or more pixels and the second conetent group is rendered using one or more pixels.

12. The method of claim 1, wherein the first conetnt group is rendered using one or more first occlusion messages.

13. The method of claim 1, wherein the first content group is rendered using one or more first mesh elements and one or more first pixels, and the second content group is rendered using one or more second mesh elements and one or more second pixels.

14. The method of claim 1, wherein the at least the portion of the first content group occludes the at least the portion of the second content group, and wherein the information associated with the first content group comprises a rendering of at least a portion of one or more surfaces of the first content group using an occlusion material.

15. A system for graphics processing at a client device, comprising:
   a plurality of memories; and
   at least one processor coupled to each of the plurality of memories configured to:
      receive, from a server, information associated with a first content group in a scene and information associated with a second content group in the scene, wherein at least a portion of the first content group occludes or potentially occludes at least a portion of the second content group; and
      render the first content group and the second content group based on the information associated with the first content group and the information associated with the second content group.

16. The system of claim 15, wherein the first content group includes at least some real content and the second content group includes at least some augmented content.

17. The system of claim 15, wherein the at least one processor is further configured to:
   render at least a portion of one or more surfaces of the first content group using an occlusion material when the at least a portion of the first content group occludes or potentially occludes the at least a portion of the second content group.

18. The system of claim 15, wherein the information associated with the first content group comprises at least a first billboard and the information associated with the second content group comprises at least a second billboard, and wherein the first content group is rendered using at least the first billboard and the second content group is rendered using at least the second billboard.

19. The system of claim 15, wherein the at least one processor is further configured to:
generate a first billboard in accordance with at least one first plane equation and a second billboard in accordance with at least one second plane equation, wherein the first content group is rendered using the first billboard and the second content group is rendered using the second billboard.

20. The system of claim 15, wherein the first content group is rendered using at least one first mesh and a first shading texture, and the second content group is rendered using at least one second mesh and a second shading texture.

21. The system of claim 20, wherein the at least one first mesh is associated with first geometry information and the at least one second mesh is associated with second geometry information.

22. The system of claim 20, wherein the second content group is rendered using either an occlusion material surface property or using all-black pixels of RGB value (0,0,0).

23. The system of claim 15, wherein the at least one processor is further configured to render the first content group and the second content group when at least one eye buffer at the client device is composited for display.

24. The system of claim 15, wherein at least one of the information associated with the first content group or the information associated with the second content group comprises a partial shading of the corresponding first content group or second content group.

25. The system of claim 15, wherein the first content group is rendered using one or more pixels and the second content group is by rendered using one or more pixels.

26. The system of claim 15, wherein the first content group is by rendered using one or more first occlusion messages.

27. The system of claim 15, wherein the first content group is rendered using one or more first mesh elements and one or more first pixels, and the second content group is rendered using one or more second mesh elements and one or more second pixels.

28. The system of claim 15, wherein the at least the portion of the first content group occludes the at least the portion of the second content group, and wherein the information associated with the first content group comprises a rendering of at least a portion of one or more surfaces of the first content group using an occlusion material.

29. A method of graphics processing at a server, comprising:
identifying a first content group and a second content group in a scene, wherein at least a portion of the first content group occludes or potentially occludes at least a portion of the second content group; and
transmitting, to a client device, information associated with the first content group in a scene and information associated with the second content group in the scene, wherein at least a portion of the first content group occludes or potentially occludes at least a portion of the second content group.

30. The method of claim 29, further comprising determining, at the server, whether at least a portion of the first content group occludes or potentially occludes at least a portion of the second content group based on at least one of a current camera pose, one or more camera poses with nearby positions or orientations, or one or more predicted camera poses including near future poses.

31. The method of claim 30, further comprising utilizing physics models and motion prediction of scene actors comprising a portion of the first content group and a portion of the second content group in order to predict a position and an orientation of a dynamic portion of at least one of the first content group and the second content group at a time of display.

32. The method of claim 30, wherein determining whether at least the portion of the first content group occludes or potentially occludes at least the portion of the second content group is at least partially performed by a graphics processing unit (GPU) or a central processing unit (CPU) of the server.

33. The method of claim 29, wherein the first content group is represented using at least one first billboard and the second content group is represented using at least one second billboard, and wherein the method further comprises:
generating the at least one first billboard in accordance with at least one first plane equation and the at least one second billboard in accordance with at least one second plane equation.

34. A system for graphics processing at a server, comprising:
a plurality of memories; and
at least one processor coupled to each of the plurality of memories configured to:
identify a first content group and a second content group in a scene, wherein at least a portion of the first content group occludes or potentially occludes at least a portion of the second content group; and
transmit, to a client device, information associated with the first content group in a scene and information associated with the second content group in the scene, wherein at least a portion of the first content group occludes or potentially occludes at least a portion of the second content group.

* * * * *